May 22, 1951 R. A. BAUDRY ET AL 2,554,234
GLAND SEAL FOR HYDROGEN-COOLED MACHINES
Filed June 2, 1947
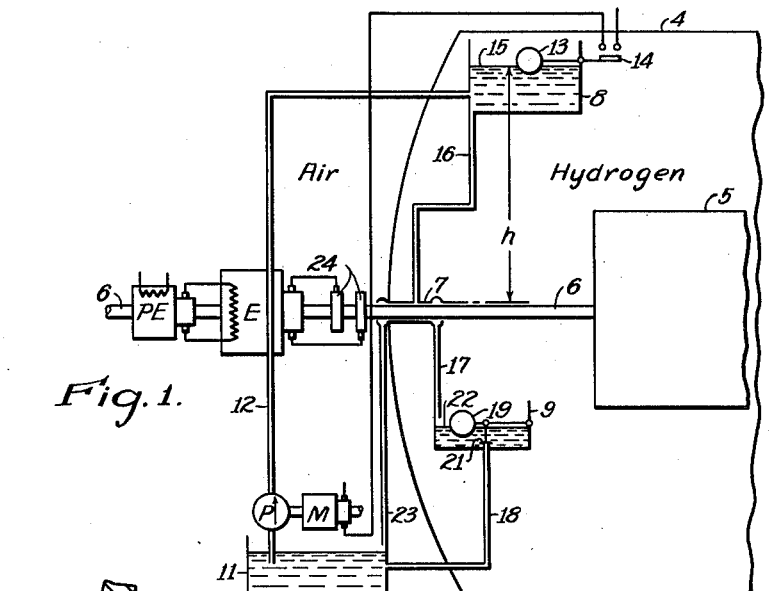
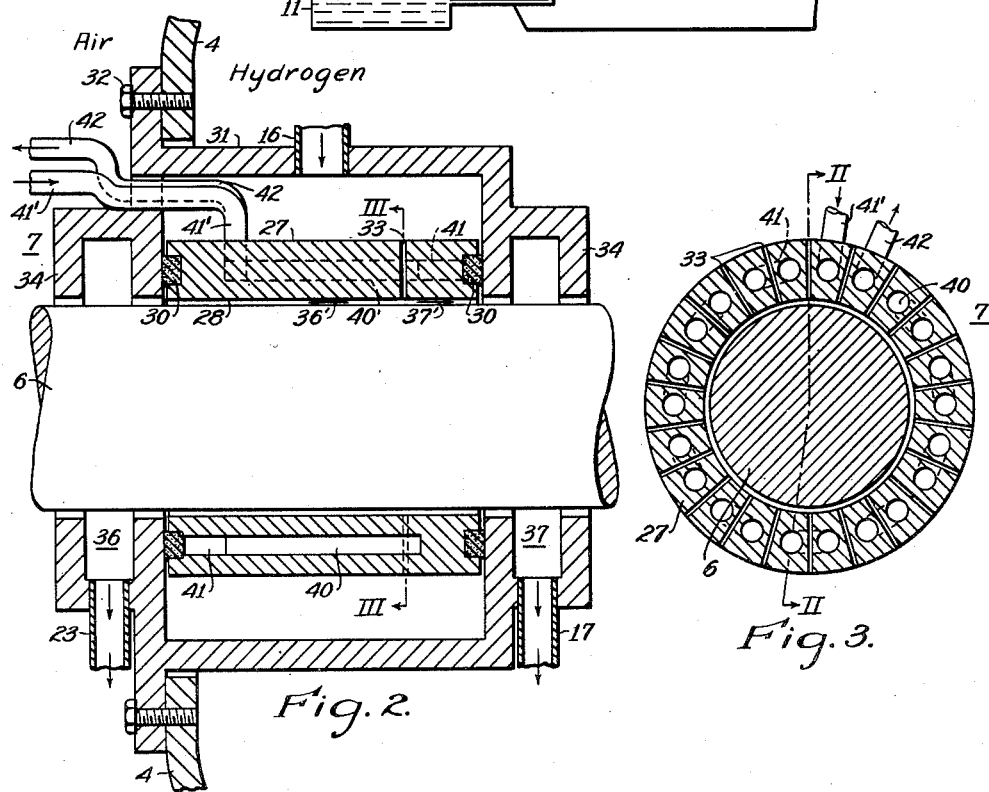
WITNESSES:
Robert C Baird
Mw. L. Groome
INVENTORS
René A. Baudry and
Bernard B. Winer.
BY O.B. Buchanan
ATTORNEY Patented May 22, 1951

2,554,234

UNITED STATES PATENT OFFICE 2,554,234

GLAND SEAL FOR HYDROGEN-COOLED MACHINES

René A. Baudry and Bernard B. Winer, Pittsburgh, Pa., assignors to Westinghouse Electric Corporation, East Pittsburgh, Pa., a corporation of Pennsylvania Application June 2, 1947, Serial No. 751,925

4 Claims. (Cl. 286—9)

Our invention relates to gland-seal assemblies which are particularly adapted for use in hydrogen-cooled synchronous condensers, although the invention is applicable also to other dynamo-electric machines and similar apparatus.

Heretofore, hydrogen-cooled synchronous condensers have not had shafts extending through the hydrogen-filled housings of the machines, thus avoiding the cost and the difficulties which are involved in providing a gland seal for the place where the shaft extends through the housing. These synchronous condensers have to have collector-rings for feeding current into their rotating field-windings; and in the totally enclosed designs heretofore employed, these collector-rings have usually had to operate in an atmosphere of hydrogen, which was disadvantageous from the standpoint of inaccessibility, decreased brush-life due to operation in an atmosphere of hydrogen, and the difficulty of proper collector-ring ventilation without recirculation of carbon-dust. There have also been difficulties in connection with the exciters for such totally enclosed hydrogen-cooled synchronous condensers, involving either the use of motor-driven exciters, mounted outside of the hydrogen enclosure, or, if the exciters were direct-driven from the condenser-shaft, it has involved placing the exciters inside of the hydrogen enclosure, subjecting said exciters to the same disadvantages as operating the collector-rings of the synchronous condenser in hydrogen.

Gland seals for hydrogen-cooled machines have been known, and they are commonly used for turbo-generators, which are driven by a turbine which is not hydrogen-enclosed, thus making it obligatory to bring the generator-shaft through the hydrogen-enclosing housing, and thus requiring a gland seal at the place where the shaft extends through the housing. These turbo-generator gland seals have involved so much heat-generation, that the seal-oil had to be pumped through the seal at an extremely rapid rate, in order to directly carry off the heat which was generated, the rate of heat-generation being too great to tolerate the additional temperature-drops which would be involved in indirect cooling-methods utilizing circulating water, which would necessarily be circulated at points physically separated from the oil-surfaces where the heat is generated. For these reasons, the oil-circulation, through the gland seal, has had to be extremely rapid, because of thermal considerations; and the oil could not be circulated very slowly, as would be desired from the standpoint of the maintenance of hydrogen-purity and the prevention of hydrogen-loss. The result has been, that elaborate and costly apparatus had to be installed, for defoaming and vacuum-treating the large volumes of sealing-oil which has been needed, in connection with the gland seals for turbo-generators.

It was because of all of these difficulties, that synchronous condensers have been built, heretofore, without having their shafts extending through the hydrogen-enclosing housing, so that no gland seals were necessary, thus involving the previously mentioned difficulties in connection with current-collector performance and inaccessibility when operating in an atmosphere of hydrogen, and also involving either dispensing with the use of direct-connected exciters, or putting up with such exciters operating inside of the hydrogen casing.

There is an important difference, however, between synchronous converters, or ordinary synchronous dynamo-electric machines, and turbine-generators, in that no large synchronous machine, other than a direct-connected turbine-driven machine, is built with only two poles, for such high-speed operation as turbo-generators. The shaft-speeds of synchronous condensers are thus many times slower than the shaft-speeds of turbo-generators, and hence a gland seal for a synchronous-condenser shaft will not generate heat so fast but that the heat can be carried away in a convenient water-cooled system. It thus becomes possible to circulate the seal-oil at an extremely slow rate, through the gland seal, this being accomplished by utilizing suitably heavy oil and applying only a relatively small pressure-head thereto.

An object of our present invention is to provide a hydrogen-cooled synchronous condenser, or similar apparatus, with a water-cooled gland seal having an extremely slow movement or circulation of the sealing-oil, so that the oil does not carry, into the hydrogen-enclosure, an objectionable amount of entrained air, from outside of the enclosure; and neither does it carry, out of the hydrogen-enclosure, an objectionable amount of entrained hydrogen. This makes it possible to place the collector-rings and the exciter or exciters outside of the hydrogen-enclosure, with all the benefits obviously attendant therewith.

But the object of our invention is more. We have introduced two innovations, including the use of an oil-reservoir, for the sealing-oil, placed inside of the hydrogen-enclosing housing of the machine, at a level above the gland seal, so that gravity-feed may be utilized for supplying oil from the reservoir to the gland seal. We have also provided an oil-trap, located within the hydrogen-enclosing housing of the machine, at a level below said gland seal, for preventing the escape of hydrogen through the drain-pipe which returns oil from the hydrogen-end of the gland seal to a sump which is located in air, outside of the hydrogen-enclosure. Since our sealing-oil is circulated extremely slowly, it becomes practicable to make the oil-reservoir have adequate capacity to provide several days' supply of oil, thus insuring continuity of seal-performance in the event of a power-failure or other shutting down of the pumping-means which is required for pumping oil from the sump to the reservoir. Heretofore, because of the fifteen-pound pressure-head of the hydrogen in the hydrogen-cooled machine, it has not been practicable to utilize gravity-feed for supplying oil, from a high reservoir outside of the machine, to a gland seal for a hydrogen-cooled synchronous condenser; and hence the continuity of the seal has been dependent upon the absolute continuity of the oil-pumping apparatus and the power-supply to said oil-pumping apparatus.

A schematic or diagrammatic showing, of an illustrative form of apparatus embodying our invention, is shown in the accompanying drawing, wherein Figure 1 is a schematic elevational view showing the general principle of our apparatus, while Figs. 2 and 3 are somewhat more detailed, but still simplified, views of our water-cooled gland seal, showing the same, respectively, in longitudinal section and transverse section, on the section-planes indicated by the lines II—II and III—III, respectively.

In Figure 1, we have shown our invention as applied to a hydrogen-cooled synchronous condenser or other similar machine having a substantially gas-tight housing 4 which is filled with hydrogen. The machine has a rotor-member 5 having a shaft 6 which extends through the housing 4. At the place where the shaft 6 extends through the housing 4, we provide a gland seal 7. We also provide an oil-reservoir 8 which is, in effect, within said housing 4, at a level above the gland seal 7; that is, the top-portion of the oil-reservoir is in communication with the hydrogen within said housing. Below the gland seal 7, also (in a similar sense) within the housing 4, we provide an oil-trap 9.

Outside of the hydrogen-filled housing 4, we provide an oil-sump 11, which is open to the atmosphere. We also provide a pumping-means, comprising piping 12 and a pump P, for pumping oil from the sump 11 and delivering it to the reservoir 8 inside of the hydrogen-filled housing 4. The pumping-means also includes a motor M for driving the pump P, under the control of a float-valve switch 13 in the reservoir 8, for maintaining the reservoir oil-level 15 within predetermined limits, said float-switch 13 including a switch 14 which is connected in the motor-circuit as shown, for starting the motor whenever the reservoir oil-level 15 falls below a predetermined point, and for stopping the motor whenever the reservoir oil-level has reached a desired height.

Inside of the hydrogen-filled housing 4, we provide piping 16 for feeding oil, by gravity, from the reservoir 8 to the gland seal 7. From the hydrogen-end of the gland seal 7, we also provide piping 17 for draining the sealing-oil which slowly escapes, at this end of the seal, and for delivering this oil to the oil-trap 9. The oil-trap 9 has a drain-pipe 18 which is connected to the sump 11 outside of the hydrogen-filled casing 4. The oil-trap 9 is provided with a float-valve 19, including a valve-element 21 which closes the top of the drain-pipe 18 unless and until the oil-level within the trap 9 rises above a predetermined point 22, thus insuring an oil-seal for preventing the escape of hydrogen, from the enclosure 4, through the drain-pipe 18, this hydrogen being normally kept at a pressure higher than atmospheric pressure.

At the air-end of the gland seal 17, we also provide a return-pipe 23, for returning the sealing-oil which escapes from that end of the gland seal, directly to the sump 11.

The utilization of the design in which the shaft 6 extends through the housing 4, under the protection of the gland seal 7, makes it possible to place, outside of the hydrogen-filled enclosure 4, considerable apparatus which was formerly, sometimes at least, placed within the hydrogen-filled enclosure. This outside apparatus is illustrated as comprising two collector-rings 24 for supplying current to the rotor member 5 of the hydrogen-cooled machine, an exciter E for supplying electrical power to the collector-rings 24, and a pilot exciter PE for exciting the exciter E, all mounted on the portion of the shaft 6 which extends out into the air.

Our design makes use of a water-cooled gland seal 7, such as is indicated, very schematically, in Figs. 2 and 3. The gland-seal proper, 27, consists of a cylindrical member of good heat-conducting material such as copper, having a bore 28 surrounding the shaft 6, at the place where the shaft extends through the machine-housing 4, with a radial clearance of about 2.5 mils between the shaft and the seal. Each end of the gland-seal member 27 carries an annular washer 30 of a fibrous composition-material which has a slidable fit within a seal-housing 31, which is attached, at its outer end, to the gas-tight machine-housing 4, as shown at 32. At one point along its length, the gland-seal element 27 is provided with a plurality of radial oil-holes 33, arranged in a circle at various points all around the circumference of the gland seal 27, and passing all the way through said gland-seal member 27, to supply sealing-oil to the shaft 6, from the interior of the seal-housing 31. Oil is delivered to the seal-housing 31 by the previously described pipe 16, which extends from the reservoir 8 in Fig. 1.

Each end of the seal-housing 31 is provided with extensions 34, which provide annular oil-escape chambers 36 and 37 for catching the sealing-oil which flows axially, in opposite directions, along the shaft 6, as indicated by the arrows 36' and 37', toward the air-end chamber 36 and the hydrogen-end chamber 37, respectively. The oil-collecting chambers 36 and 37 are drained, respectively, by the previously described drain-pipes 23 and 17, these drain-pipes being large enough to carry gas and bubbles, as well as liquid-oil.

Any suitable means is provided for water-cooling the main oil-seal cylindrical member 27, for cooling the same with water or any other coolant other than the oil which is utilized for sealing purposes. As shown, the cylindrical member 27 is drilled with a plurality of axially extending holes 40, which are suitably connected, at their ends 41, to provide a zigzag passage back and forth all the way around the cylindrical gland-seal member 27, the water being admitted through a pipe which is diagrammatically indicated at 41', and discharged through a pipe which is diagrammatically indicated at 42.

In the operation of our sealing-means, it will be noted that we have omitted the elaborate defoaming and vacuum-treating system (not shown) such as has previously been needed, in practical sealing-oil circulation-systems, for removing as much water and air from the oil as possible, before supplying it to the gland seal. Such oil-treating means (not shown) was needed, heretofore, because the oil was circulated at a very rapid rate, in order to act as its own cooling-agent, carrying away the heat which is generated within the seal, and that much oil could not be permitted to pass into the hydrogen-casing, where it would give up some of its entrained water-vapor and air, which would quickly contaminate the hydrogen.

Our invention, however, consists of a simple, water-cooled seal, which permits the use of a high-viscosity sealing-oil, and thus reduces the rate of oil-flow to such an extremely low value that it has been possible for us to entirely eliminate the previously utilized oil-purification treating-apparatus (not shown). At the same time, our apparatus restricts the hydrogen-consumption to an amount which is well within the prescribed limit which is permissible in hydrogen-cooled machines, this restriction being the result of the extremely slow rate of oil-flow which we utilize.

In the operation of our sealing-apparatus, it will be noted that the supply of sealing-oil, at the level 15 in the reservoir 8 (Fig. 1), is under the gas-pressure within the machine-housing 4, being at the same pressure as the hydrogen to which it is exposed. The oil surrounding the seal 7, or the oil within the seal-housing 31, surrounding the cylindrical oil-seal member 27 in Fig. 2, is under this hydrogen gas-pressure, plus the head $h$ due to the elevation of the reservoir-level 15 above the seal 7, as indicated in Fig. 1. Accordingly, the effective pressure-difference, which is effective in causing the oil-flow 37', in Fig. 2, between the oil-holes 33 and the hydrogen-end 37 of the seal 7, will be equal to this head $h$. The effective pressure-difference, which is effective in causing the oil-flow 36', between the oil-holes 33 and the air-end 36 of the seal 7, will be the sum of the hydrogen-pressure plus the head $h$.

The oil which surrounds the shaft 6, between the shaft and the seal, effectively separates the outside air from the hydrogen which is inside of the machine-housing 41. This oil also lubricates and centers the seal 27 (Fig. 2) on the shaft 6. While we are not limited to any particular oil or any particular temperature, it may be noted that an oil of high viscosity is preferred, kept at about 50° C. by the water-cooling.

In our apparatus, the cycle of oil-flow is thus automatic and continuous. The oil-reservoir 8, which is disposed inside of the machine-housing 4, is of adequate size to provide at least a day's supply of oil, and preferably several days' supply, at the slow rate at which the oil is flowing through the seal 7. This insures continuity of seal-performance, in the event of a failure of the power-supply for the pump-motor M, and it also permits servicing of the pump P, or of the motor M, or other parts, without affecting the efficiency of the seal. At the same time, the use of a relatively small pressure-head $h$ results in a slow oil-flow 37' (Fig. 2) at the hydrogen-end of the seal; and the disposition of the reservoir 8, at the hydrogen-pressure, that is, inside of the machine-casing 4, avoids the necessity for maintaining a constantly-running pump, such as the pump P, which would be constantly running so as to continuously supply oil at the total overall pressure-head equal to the hydrogen-pressure of the hydrogen-cooled machine, plus the pressure-head $h$. By putting the reservoir 8 inside the machine-housing 4, we avoid the necessity for continuously running a pump to create an oil-pressure higher than the hydrogen-pressure within the machine-housing 4, and in this manner, we achieve a performance which is automatic and continuous, as long as there is any oil in the reservoir 8, regardless of whether the pump P is working or not.

We claim as our invention:

1. A gas-cooled machine comprising a housing filled with a gas other than the surrounding atmosphere, a rotor-member having a shaft extending out through said housing, a gland seal surrounding said shaft where it extends through the housing, said gland seal having two outlets and a single inlet for supplying oil which passes along the shaft through the seal in opposite directions from said inlet to the respective outlets, one of said outlets being on the hydrogen-side of said gland seal, and the other outlet being on the air-side of said gland seal, an oil-reservoir at a level above said gland seal, the top-portion of the oil-reservoir being in communication with the gas within said housing, an oil-trap at a level below said gland seal, the top-portion of the oil-trap being in communication with the gas within said housing, an oil-sump outside of said housing, means for pumping oil and delivering it from said sump to said reservoir, means within said reservoir for so controlling said pumping-means as to maintain the reservoir oil-level within predetermined limits, means for delivering oil from said reservoir to said inlet of the gland seal, means for delivering oil from the hydrogen-side of said gland seal to said trap, valve-and-pipe means for delivering oil from said trap to said sump, means within said trap for so controlling said valve-and-pipe means as to maintain a trap oil-level within predetermined limits, and means for delivering oil from the air-side of said gland seal to the sump 2. The invention as defined in claim 1, characterized by said gland seal having passageways therein for a cooling liquid other than the gland-oil, and means for circulating such a cooling liquid through the gland seal, the rate of oil-delivery to said gland seal being limited to such a slow rate that said reservoir contains more than a day's supply of oil, even though said pumping-means should be shut down.

3. The invention as defined in claim 1, characterized by said gland-seal having cooling-means associated therewith for cooling the seal-oil which passes therethrough, the rate of oil-delivery to said gland seal being so slow as to require some cooling in the seal, and being limited, also, to such a slow rate that said reservoir contains more than a day's supply of oil, even though said pumping-means should be shut down.

4. The invention as defined in claim 1, characterized by said pumping-means and the controlling-means therefor being of such nature as to provide an intermittent oil-flow to said reservoir, whereby to supply a minimum quantity of atmosphere-exposed sump-oil to said hydrogen-exposed reservoir-oil.

RENÉ A. BAUDRY.
BERNARD B. WINER.

REFERENCES CITED

The following references are of record in the file of this patent:

UNITED STATES PATENTS

| Number | Name | Date |
|---|---|---|
| 722,875 | Naef | Mar. 17, 1903 |
| 1,559,182 | Rice | Oct. 27, 1925 |
| 1,575,970 | Carrier | Mar. 9, 1926 |
| 1,841,863 | Van Rijawijk | Jan. 19, 1932 |
| 1,873,267 | Bigelow et al. | Aug. 23, 1932 |
| 1,885,546 | Rice | Nov. 1, 1932 |
| 2,236,274 | Rice et al. | Mar. 25, 1941 |